US009013967B1

(12) United States Patent
Nakamura et al.

(10) Patent No.: US 9,013,967 B1
(45) Date of Patent: Apr. 21, 2015

(54) HEAT-DISSIPATING STEPPED SLIDER FOR A HEAT-ASSISTED MAGNETIC RECORDING HEAD

(71) Applicant: HGST Netherlands B.V., Amsterdam (NL)

(72) Inventors: Shigeo Nakamura, Odawara (JP); Irizo Naniwa, Fujisawa (JP); Harukazu Miyamoto, Higashimurayama (JP); Tomoaki Uno, Fujisawa (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/322,707

(22) Filed: Jul. 2, 2014

(51) Int. Cl.
*G11B 11/00* (2006.01)
*G11B 5/02* (2006.01)
*G11B 11/105* (2006.01)

(52) U.S. Cl.
CPC .............................. *G11B 11/10532* (2013.01)

(58) Field of Classification Search
None
See application file for complete search history.

(56) References Cited

U.S. PATENT DOCUMENTS

| | | | |
|---|---|---|---|
| 7,957,085 B2 | 6/2011 | Tanaka et al. | |
| 8,345,519 B1 * | 1/2013 | Pan | 369/13.33 |
| 8,441,896 B2 | 5/2013 | Wang et al. | |
| 8,503,493 B1 | 8/2013 | Fujii et al. | |
| 8,514,671 B2 | 8/2013 | Zhao et al. | |
| 8,599,895 B2 | 12/2013 | Nishioka et al. | |
| 8,665,677 B1 * | 3/2014 | Panitchakan et al. | 369/13.17 |
| 2008/0056073 A1 * | 3/2008 | Shimizu | 369/13.02 |
| 2010/0079895 A1 * | 4/2010 | Takayama et al. | 360/59 |
| 2010/0202256 A1 * | 8/2010 | Ito et al. | 369/13.33 |
| 2012/0087217 A1 * | 4/2012 | Sasaki et al. | 369/13.24 |
| 2013/0142478 A1 | 6/2013 | Sluzewski et al. | |
| 2013/0279312 A1 * | 10/2013 | Hurley et al. | 369/13.02 |
| 2013/0286803 A1 * | 10/2013 | Shivarama et al. | 369/13.32 |
| 2014/0252560 A1 * | 9/2014 | Zhong et al. | 257/620 |

OTHER PUBLICATIONS

Baoxi Xu et al., Thermal Analysis of Heat-Assisted Magnetic Recording Optical Head with Laser Diode on Slider, Japanese Journal of Applied Physics, Sep. 20, 2011, vol. 50, The Japan Society of Applied Physics, published online.
X. Shaomin et al., Investigation of the Local Temperature Increase for Heat Assisted Magnetic Recording (HAMR), IEEE Transactions on Magnetics, pp. 1, vol., PP, No. 99, IEEE, Apr. 23, 2014.

* cited by examiner

*Primary Examiner* — Thang Tran
(74) *Attorney, Agent, or Firm* — John H. Henkhaus

(57) ABSTRACT

In a heat-assisted magnetic recording (HAMR) hard disk drive, a heat-dissipating head slider assembly is described in which the slider is stepped on the disk-opposing side and a HAMR laser module is mounted on the lower surface to assist with dissipation of heat from the laser. The lower surface is a surface of the main body of the slider and is composed primarily of a first material, and the slider may include a heat-dissipating plate that forms the higher stepped surface, where the plate is composed of a second material that has a higher thermal conductivity than the first material, such as silicon.

20 Claims, 7 Drawing Sheets

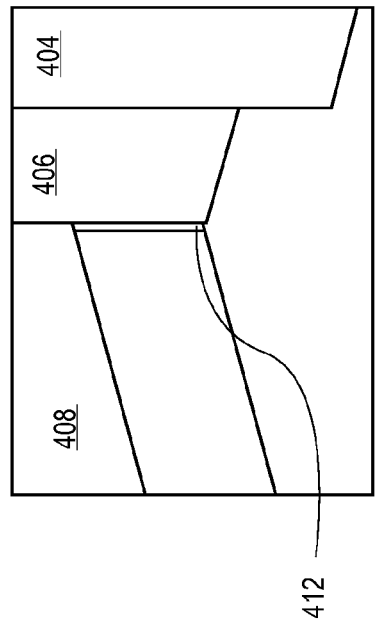
FIG. 4B
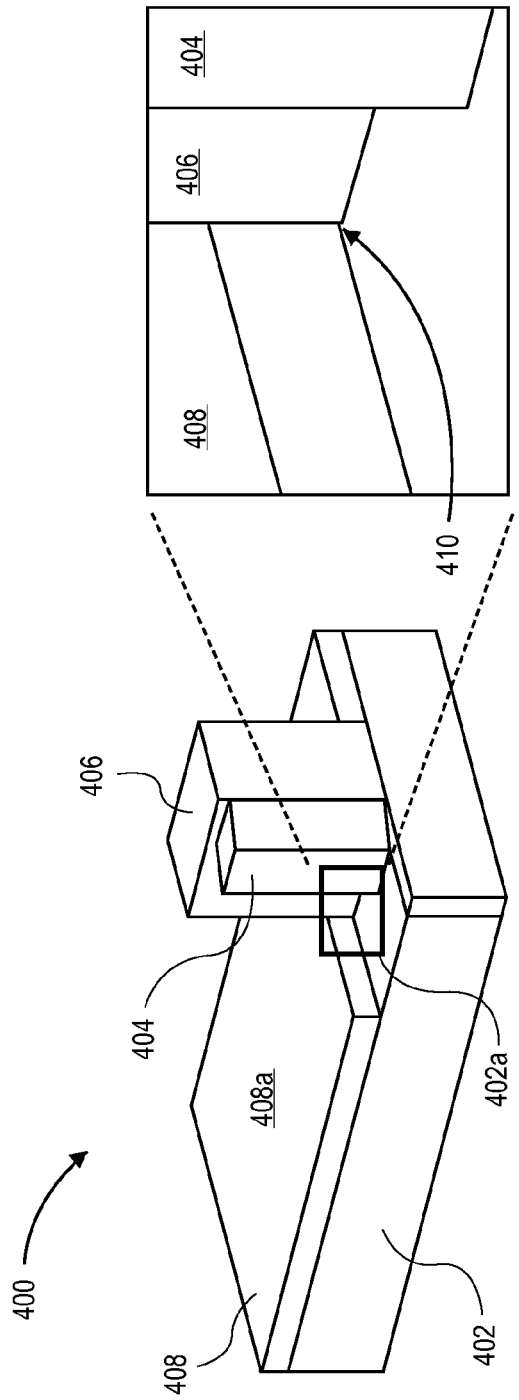
FIG. 4C
FIG. 4A

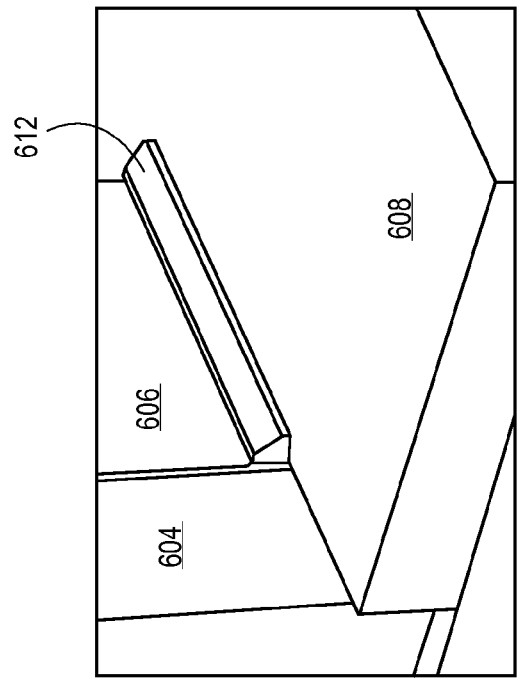
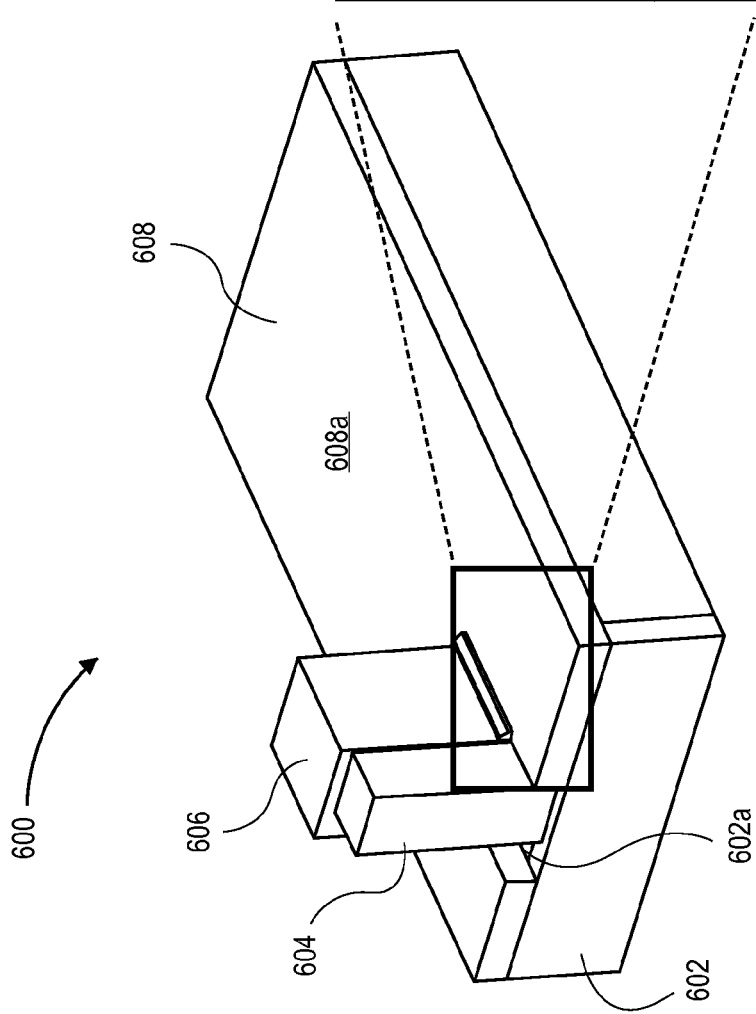
FIG. 6B
FIG. 6A

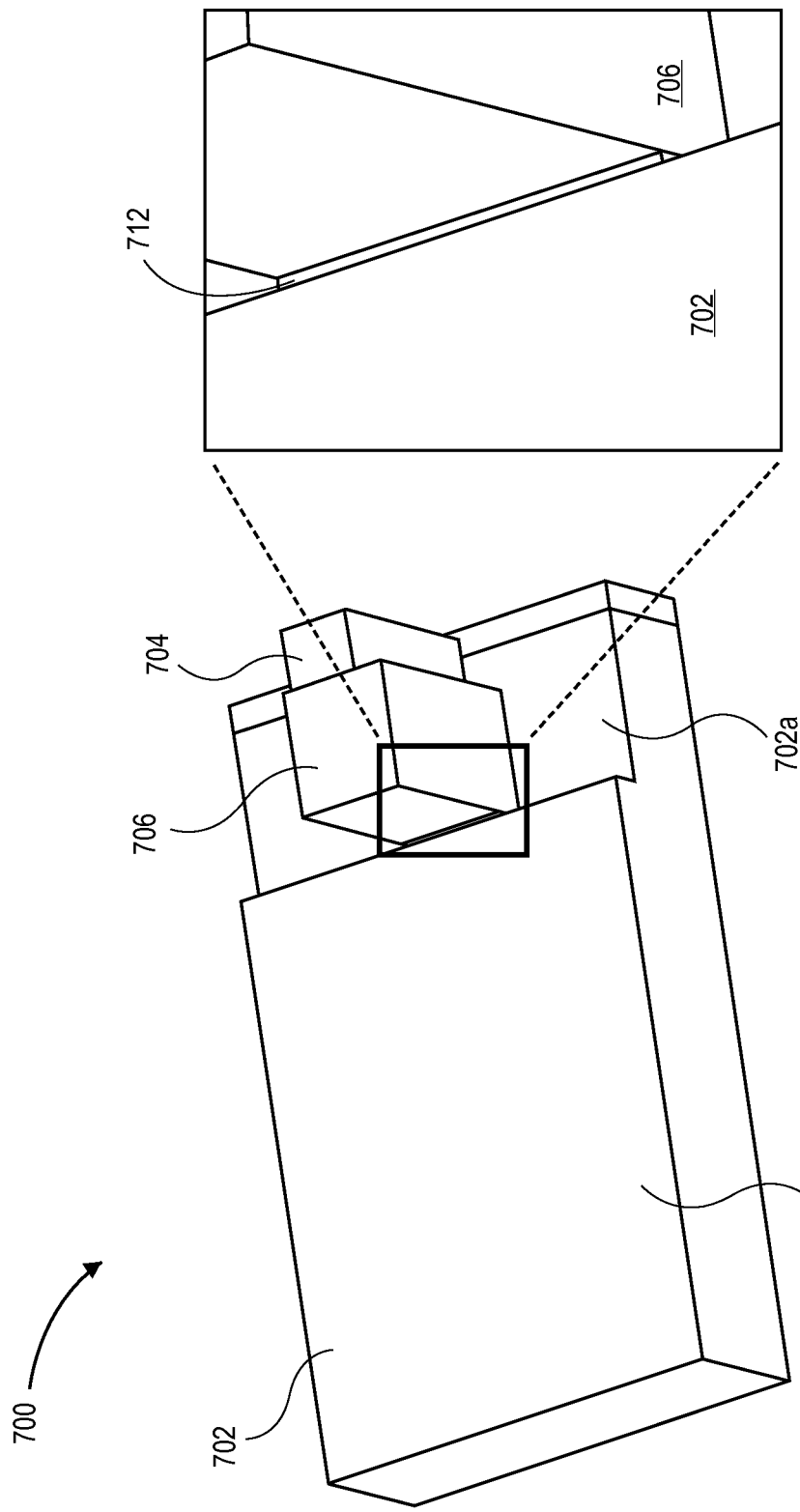

HEAT-DISSIPATING STEPPED SLIDER FOR A HEAT-ASSISTED MAGNETIC RECORDING HEAD

FIELD OF EMBODIMENTS OF THE INVENTION

Embodiments of the invention may relate generally to hard disk drives and more particularly to improving the heat dissipation associated with a laser for a heat-assisted magnetic recording head.

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read/write head that is positioned over a specific location of a disk by an actuator. A read/write head uses a magnetic field to read data from and write data to the surface of a magnetic-recording disk.

Increasing areal density (a measure of the quantity of information bits that can be stored on a given area of disk surface) is one of the ever-present goals of hard disk drive design evolution, and has led to the necessary development and implementation of various means for reducing the disk area needed to record a bit of information. It has been recognized that one significant challenge with minimizing bit size is based on the limitations imposed by the superparamagnetic effect whereby, in sufficiently small nanoparticles, the magnetization can randomly flip direction under the influence of thermal fluctuations.

Heat-assisted magnetic recording (HAMR) [which may also be referred to as energy-assisted magnetic recording (EAMR) or thermal-assisted magnetic recording (TAR)] is a known technology that magnetically records data on high-stability media using, for example, laser thermal assistance to first heat the media material. HAMR takes advantage of high-stability, high coercivity magnetic compounds, such as iron platinum alloy, which can store single bits in a much smaller area without being limited by the same superparamagnetic effect that limits the current technology used in hard disk drive storage. However, at some capacity point the bit size is so small and the coercivity correspondingly so high that the magnetic field used for writing data cannot be made strong enough to permanently affect the data and data can no longer be written to the disk. HAMR solves this problem by temporarily and locally changing the coercivity of the magnetic storage medium by raising the temperature above the Curie temperature, at which the medium effectively loses coercivity and a realistically achievable magnetic write field can write data to the medium.

One approach to HAMR designs is to utilize a semiconductor laser system to heat the media to lower its coercivity, whereby the optical energy is transported from the laser to the slider ABS via a waveguide and is concentrated to a nanometer-sized spot utilizing a near field transducer (NFT). More detailed information about the structure and functionality of a thermally assisted magnetic write head employing an NFT can be found in U.S. Pat. No. 8,351,151 to Katine et al., the disclosure of which is incorporated by reference in its entirety for all purposes as if fully set forth herein.

The performance of a HAMR system is largely affected by the performance of the associated laser. Therefore, inhibiting the degradation of the laser power during operation and over time is desirable for optimal performance of such a system.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are directed towards a heat-dissipating heat-assisted magnetic recording (HAMR) head slider assembly, to a HAMR head slider head gimbal assembly (HGA), and to a hard disk drive comprising a HAMR head slider assembly, in which the head slider is stepped on the disk-opposing side. That is, the head slider comprises a higher distal surface and an adjacent lower proximal surface nearer the magnetic write head, where a HAMR laser module is mounted on the lower proximal surface to assist with dissipation of heat from the laser.

According to embodiments, the lower proximal surface is a surface of the main body of the slider and is composed primarily of a first material, and the slider includes a heat-dissipating plate that forms the higher distal surface, where the plate is composed of a second material that has a higher thermal conductivity than the first material, such as silicon for a non-limiting example. According to embodiments, the configuration of the laser module may vary, as well as how the laser module interfaces with the heat-dissipating plate, such as whether there is an air gap between the two bodies or whether and how the bodies are connected with solder, all of which affect the heat-dissipative qualities of the HAMR head slider.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 4A is a perspective view illustrating a heat-dissipating stepped HAMR head slider assembly, according to an embodiment of the invention;

FIG. 4B is a perspective view illustrating a first interface between a heat-dissipating plate and a laser module of the stepped HAMR head slider assembly of FIG. 4A, according to an embodiment of the invention;

FIG. 4C is a perspective view illustrating a second interface between the heat-dissipating plate and the laser module of the stepped HAMR head slider assembly of FIG. 4A, according to an embodiment of the invention;

FIG. 6A is a perspective view illustrating a heat-dissipating HAMR head slider assembly, according to an embodiment of the invention;

FIG. 6B is a perspective view illustrating an interface between a heat-dissipating plate and a laser module of the HAMR head slider assembly of FIG. 6A, according to an embodiment of the invention;

FIG. 7A is a perspective view illustrating a heat-dissipating stepped HAMR head slider assembly, according to an embodiment of the invention; and FIG. 7B is a perspective view illustrating an interface between a step feature and a laser module of the HAMR head slider assembly of FIG. 7A, according to an embodiment of the invention.

DETAILED DESCRIPTION

Approaches to a heat-assisted magnetic recording (HAMR) head slider assembly in which the head slider is stepped on the disk-opposing side to assist with dissipation of heat from a laser module, for use in a hard disk drive for example, are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of an Illustrative Operating Environment

Figure 1:
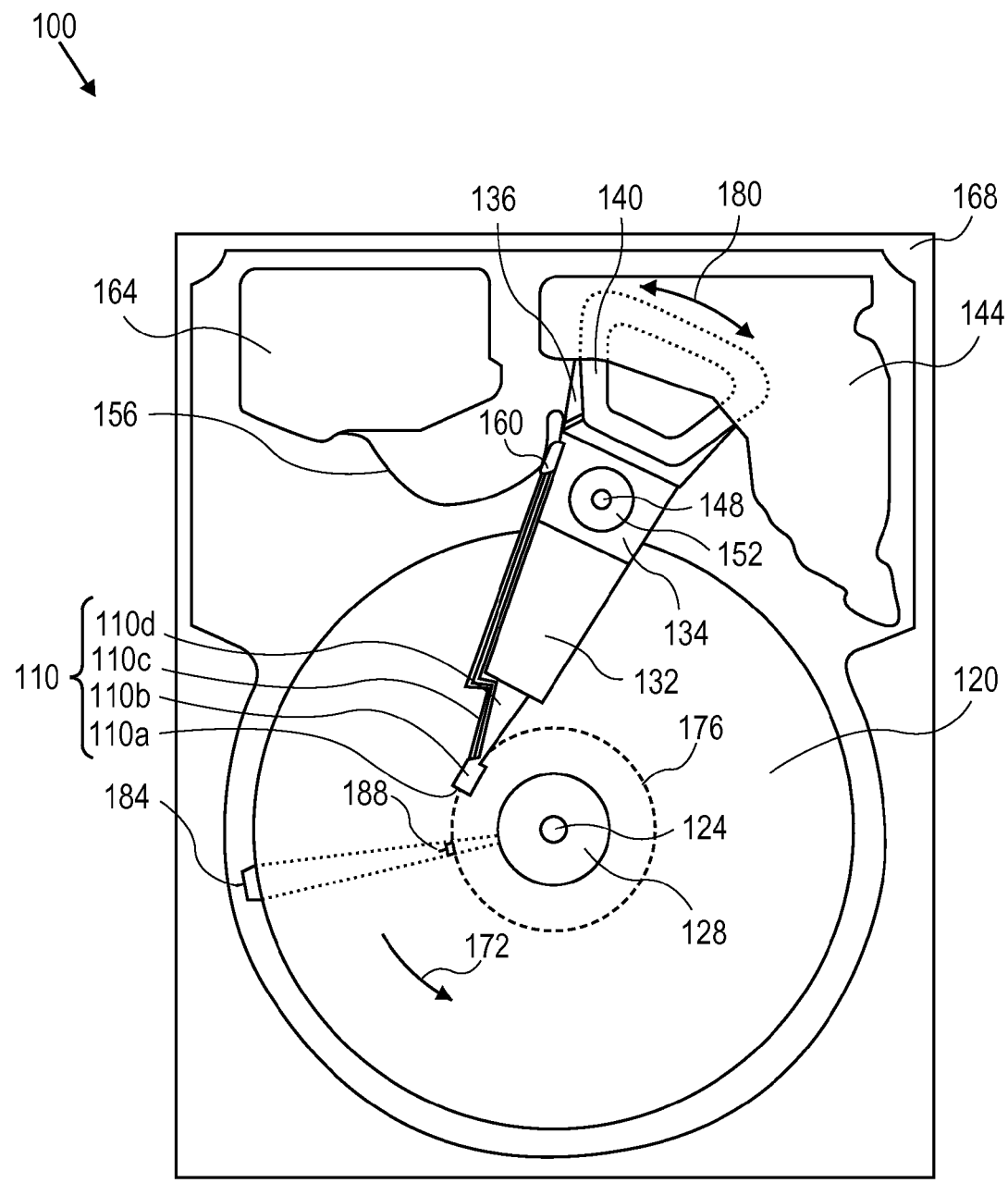
FIG. 1 is a plan view illustrating a hard disk drive (HDD), according to an embodiment of the invention.

Embodiments of the invention may be used in the context of a magnetic writer for a hard-disk drive (HDD). In accordance with an embodiment of the invention, a plan view illustrating an HDD 100 is shown in FIG. 1. FIG. 1 illustrates the functional arrangement of components of the HDD including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider, and a load beam 110d attached to the lead suspension 110c. The HDD 100 also includes at least one magnetic-recording media 120 rotatably mounted on a spindle 124 and a drive motor (not visible) attached to the spindle 124 for rotating the media 120. The head 110a includes a write element and a read element for respectively writing and reading information stored on the media 120 of the HDD 100. The media 120 or a plurality of disks may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not visible). The armature 136 of the VCM is attached to the carriage 134 and is configured to move the arm 132 and the HGA 110 to access portions of the media 120 being mounted on a pivot-shaft 148 with an interposed pivot-bearing assembly 152. In the case of an HDD having multiple disks, or platters as disks are sometimes referred to in the art, the carriage 134 is called an "E-block," or comb, because the carriage is arranged to carry a ganged array of arms that gives it the appearance of a comb.

With further reference to FIG. 1, in accordance with an embodiment of the present invention, electrical signals, for example, current to the voice coil 140 of the VCM, write signal to and read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a casting, depending upon whether the HDD housing is cast, in conjunction with an HDD cover provides a sealed, protective enclosure for the information storage components of the HDD 100.

With further reference to FIG. 1, in accordance with an embodiment of the present invention, other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the media 120 that is affixed to the spindle 124 by the disk clamp 128; as a result, the media 120 spins in a direction 172. The spinning media 120 creates a cushion of air that acts as an air-bearing on which the air-bearing surface (ABS) of the slider 110b rides so that the slider 110b flies above the surface of the media 120 without making contact with a thin magnetic-recording medium in which information is recorded.

The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the media 120. Information is stored on the media 120 in a plurality of stacked tracks arranged in sectors on the media 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

References herein to a hard disk drive, such as HDD 100 illustrated and described in reference to FIG. 1, may encompass a data storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differs, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

Figure 2:
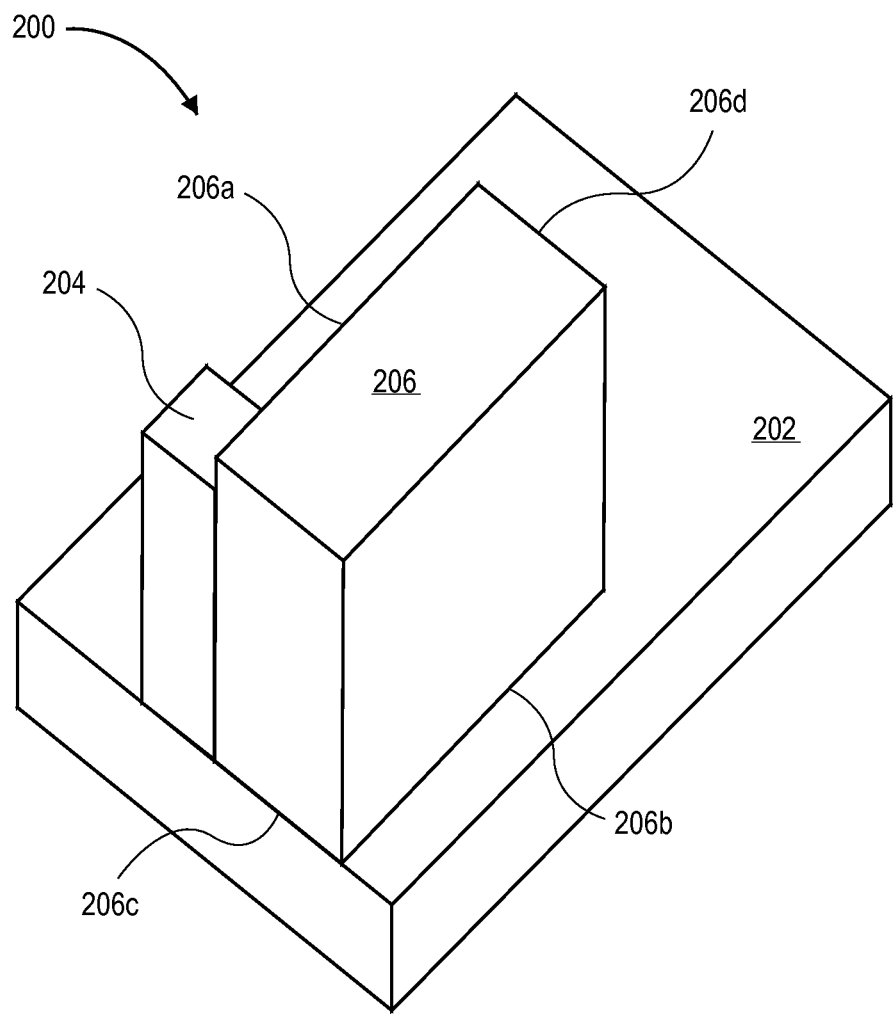
FIG. 2 is perspective view illustrating a heat-assisted magnetic recording (HAMR) head slider coupled with a laser module, according to an embodiment of the invention.

With HAMR, a laser light source (e.g., a laser diode) needs to be integrated onto a more traditional magnetic recording head. Laser diodes are fragile and not suitable for direct mechanical attachment to the recording head slider. Furthermore, a laser emission test utilized for checking the quality is virtually impossible to perform with a laser diode alone, before assembling. Therefore, a submount assembly may be used to mount the laser diode to the slider body. FIG. 2 is perspective view illustrating a heat-assisted magnetic recording (HAMR) head slider coupled with a laser module, according to an embodiment of the invention. HAMR head slider assembly 200 comprises a laser light source 204 (or simply "laser"), such as a semiconductor laser or laser diode, mounted to a submount 206 which is attached to a head slider 202.

For reference purposes, submount 206 is described as having a first longitudinal side 206a and a second longitudinal side 206b, as well as a first lateral side 206c closer to the magnetic write head 303 (FIG. 3) than a second lateral side 206d. Thus, in the laser module configuration depicted in FIG. 2 (and FIG. 3), the laser 204 is coupled to the submount 206 on the first longitudinal side 206a and closer to the first lateral side 206c than the second lateral side 206d, i.e., nearer write head 303.

Figure 3:
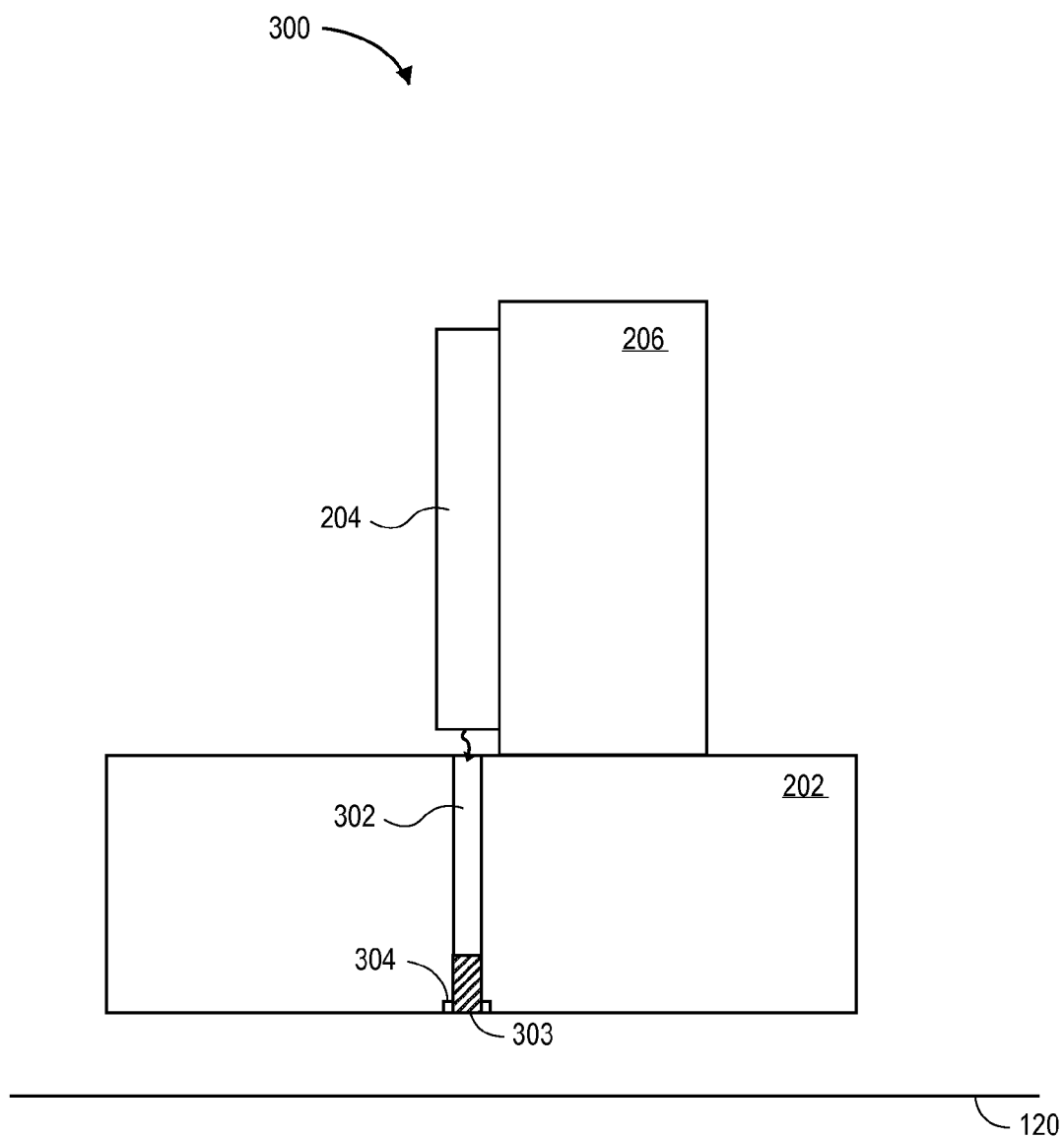
FIG. 3 is a side cutaway view illustrating a HAMR head slider coupled with a laser module, according to an embodiment of the invention.

FIG. 3 is a side cutaway view illustrating a HAMR head slider coupled with a laser module, according to an embodiment of the invention. With reference to FIG. 3, a HAMR head slider assembly 300 is described, which may be implemented into a hard disk drive such as HDD 100 (FIG. 1). HAMR head slider assembly 300 comprises a laser module assembly coupled with a HAMR head slider 202. The laser module assembly comprises the laser 204 mounted to submount 206, as explained in reference to FIG. 2.

HAMR head slider 202 comprises a HAMR waveguide 302 configured to guide optical energy from the laser 204 through the HAMR head slider 202 to a near-field transducer (NFT) 304 positioned near a write head 303. For a non-limiting example for further understanding, the NFT 304 may utilize a metal optical device such as an E-antenna (or a triangular antenna) which, when illuminated by light, excites a charge oscillation called a plasmon within the antenna. The charges concentrated at the edge of the antenna generate a localized higher intensity optical near-field. The optical near-field is electromagnetically coupled to the magnetic media 120 locally creating a high frequency current. The resistive losses associated with this current are converted to heat, raising the local temperature in the media 120.

During operation, the laser generates heat simultaneously with optical light. The heat generated by the laser typically diffuses by flowing from the laser to the submount to the slider and then to the media. The thermal conductivity between the submount and the slider is relatively low, so the heat is not dissipated to the slider air bearing surface as effectively as desired. Consequently, the laser heats up and degradation of the laser power and performance may occur, resulting in a less efficient laser.

Heat-Dissipating Slider for HAMR Head

In order to maintain the long-term reliability of the laser for a HAMR head, e.g., by maintaining stable radiation, it is beneficial to control the rise in temperature of the laser. However, heat dissipation from the slider to the media, e.g., a disk, is not always robust enough and therefore a significant increase in the temperature of the laser may occur. The temperature distribution within sliders, which are typically composed primarily of AlTiC, shows that the thermal conductivity of sliders is relatively low. Therefore the area of the slider nearest the heat source, i.e., the laser, becomes a hot spot and the heat diffusion to the media leaves room for improvement. A more uniform temperature distribution within the slider can provide for more effective heat diffusion to the media.

FIG. 4A is a perspective view illustrating a heat-dissipating stepped HAMR head slider assembly, according to an embodiment of the invention. HAMR head slider assembly 400 (or simply slider assembly 400) comprises a laser module, comprising a laser 404 and an associated submount 406, mounted on a slider 402. Slider 402 has a higher distal surface 408a and an adjacent lower proximal surface 402a, with proximal and distal being described relative to the laser module. Therefore, slider 402 is referred to as a "stepped" slider because the adjacent surfaces, i.e., the higher distal surface 408a and the lower proximal surface 402a, form a step feature. According to an embodiment, the laser module is mounted on the lower proximal surface 402a of the stepped slider 402.

According to an embodiment, coupled with slider 402 is a heat-dissipating plate 408, which comprises the higher distal surface 408a. The heat-dissipating plate 408 is composed of a material that has a higher thermal conductivity than the material of which the slider 402 main body, including the lower proximal surface 402a, is composed. Consequently, the heat-dissipating plate 408 assists in dissipating the heat generated by laser 404 to the media by providing better thermal diffusion characteristics for slider 402 and slider assembly 400. According to an embodiment, the heat-dissipating plate 408 is composed primarily of silicon (Si). According to another embodiment, the heat-dissipating plate 408 is composed primarily of aluminum nitride (AlN).

FIG. 4B is a perspective view illustrating a first interface between a heat-dissipating plate and a laser module of the stepped HAMR head slider assembly of FIG. 4A, according to an embodiment of the invention. According to this embodiment, the interface between the heat-dissipating plate 408 and the submount 406 of the laser module comprises a gap 410. Furthermore, for a non-limiting example, an implementation study has shown that an approximately 9% improvement in temperature rise may be achieved by using a silicon heat-dissipating plate 408 separated from the laser module submount 406 by a narrow gap such as gap 410.

FIG. 4C is a perspective view illustrating a second interface between the heat-dissipating plate and the laser module of the stepped HAMR head slider assembly of FIG. 4A, according to an embodiment of the invention. According to this embodiment, the interface between the heat-dissipating plate 408 and the submount 406 of the laser module comprises solder 412.

The use of solder 412 for connecting the heat-dissipating plate 408 and the submount 406 may vary from implementation to implementation. As such, the heat-dissipating plate 408 and the submount 406 may be connected with a solder 412 fillet, or may be connected with a solder 412 fill largely along the entire interface if manufacturing techniques allow for it. Furthermore, the use herein of the term "solder" is intended to include traditional "soft solders" such as lead-tin and indium based alloys, as well as other relatively highly thermally conductive materials (e.g., materials known and used for interconnectivity in electronics and semiconductor manufacturing processes), such as silver paste and silver nano/submicron paste (also referred to as "nanosilver paste"), for non-limiting examples.

As illustrated in FIG. 4A, the laser 404 is coupled to the submount 406 on the first longitudinal side (see, e.g., first longitudinal side 206a of FIG. 2) and closer to the first lateral side than the second lateral side (see, e.g., first lateral side 206c and second lateral side 206d of FIG. 2). Thus, the heat-dissipating plate 408 may be shaped to be adjacent the second lateral side 206d as well as the second longitudinal side 206b of submount 406, such as depicted in FIG. 4A. With such a configuration, the use of solder 412 (FIG. 4C) for connecting the heat-dissipating plate 408 and the submount 406 may vary from implementation to implementation, such as use of a solder 412 fillet along one or both of the second lateral side 206d and the second longitudinal side 206b of submount 406, or may be connected with a solder 412 fill largely along the entire interface of one or both of the second lateral side 206d and the second longitudinal side 206b of submount 406. Furthermore, for a non-limiting example, an implementation study has shown that an approximately 21% improvement in temperature rise may be achieved by using a silicon heat-dissipating plate 408 connected with the laser module submount 406 with solder 412.

Figure 5:
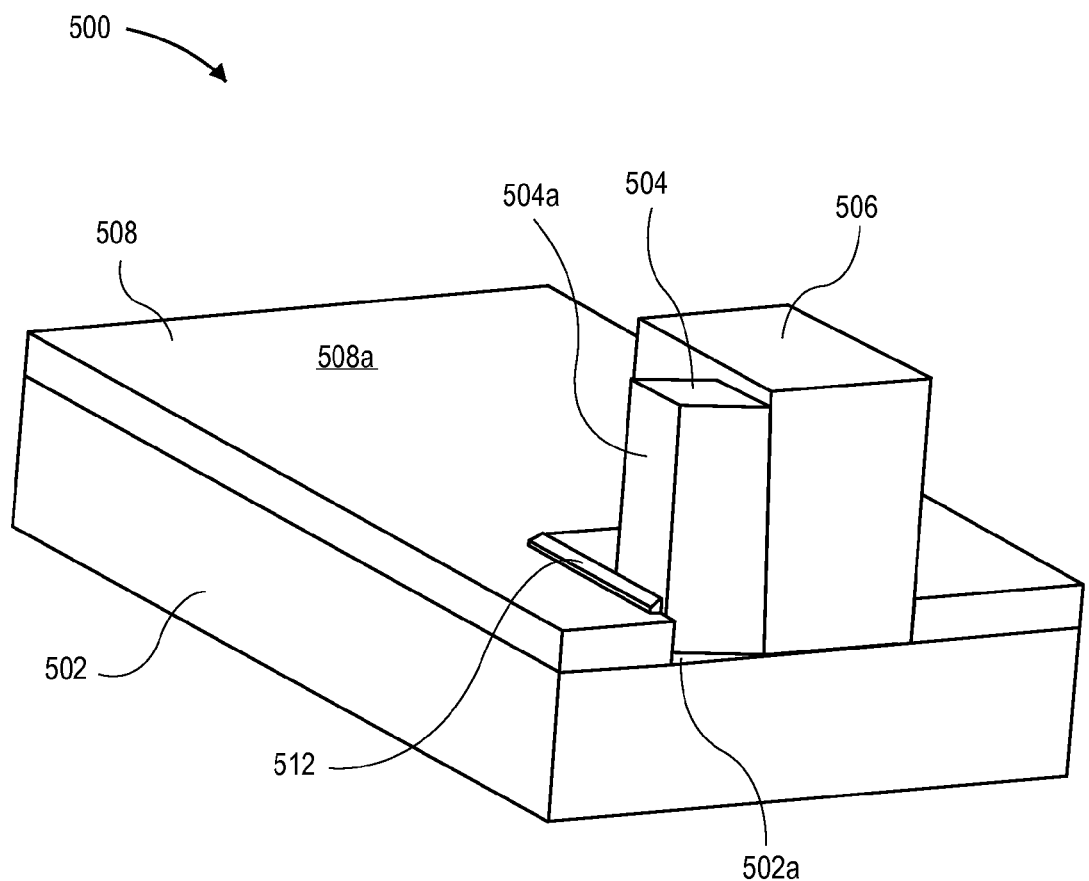
FIG. 5 is a perspective view illustrating a heat-dissipating stepped HAMR head slider assembly, according to an embodiment of the invention.

FIG. 5 is a perspective view illustrating a heat-dissipating stepped HAMR head slider assembly, according to an embodiment of the invention. HAMR head slider assembly 500 (or simply slider assembly 500) comprises a laser module, comprising a laser 504 and an associated submount 506, mounted on a slider 502. Slider 502 has a higher distal surface 508a and an adjacent lower proximal surface 502a, with proximal and distal being described relative to the laser module. Therefore, slider 502 is referred to as a "stepped" slider because the adjacent surfaces, i.e., the higher distal surface 508a and the lower proximal surface 502a, form a step feature. According to an embodiment, the laser module is mounted on the lower proximal surface 502a of the stepped slider 502.

According to an embodiment, coupled with slider 502 is a heat-dissipating plate 508, which comprises the higher distal surface 508a. The heat-dissipating plate 508 is composed of a material that has a higher thermal conductivity than the material of which the slider 502 main body, including the lower proximal surface 502a, is composed. Consequently, the heat-dissipating plate 508 assists in dissipating the heat generated by laser 504 to the media by providing better thermal diffusion characteristics for slider 502 and slider assembly 500. According to an embodiment, the heat-dissipating plate 508 is composed primarily of silicon (Si). According to another embodiment, the heat-dissipating plate 408 is composed primarily of aluminum nitride (AlN).

As illustrated in FIG. 5, the laser 504 is coupled to the submount 506 on the first longitudinal side (see, e.g., first longitudinal side 206a of FIG. 2) and closer to the first lateral side than the second lateral side (see, e.g., first lateral side 206c and second lateral side 206d of FIG. 2). Thus, the heat-dissipating plate 508 may be shaped to be adjacent to the second lateral side 206d and the second longitudinal sides 206b of the submount 406, as well as adjacent to a longitudinal side 504a of the laser 504, such as depicted in FIG. 5. With such a configuration, the use of solder 512 for connecting the heat-dissipating plate 508 and the submount 506 and/or the laser 504 may vary from implementation to implementation, such as use of a solder 512 fillet along any one or more of the second lateral side 206d and the second longitudinal sides 206b of the submount 506 and the longitudinal side 504a of the laser 504, or may be connected with a solder 512 fill largely along the entire interface of one or more of these interfaces. Furthermore, for a non-limiting example, an implementation study has shown that an approximately 24% improvement in temperature rise may be achieved by using a silicon heat-dissipating plate 508 connected with the laser 504 and submount 506, e.g., three connections, with solder 512.

FIG. 6A is a perspective view illustrating a heat-dissipating HAMR head slider assembly, according to an embodiment of the invention. HAMR head slider assembly 600 (or simply slider assembly 600) comprises a laser module, comprising a laser 604 and an associated submount 606, mounted on a slider 602. Slider 602 has a higher distal surface 608a and an adjacent lower proximal surface 602a, with proximal and distal being described relative to the laser module. Therefore, slider 602 is referred to as a "stepped" slider because the adjacent surfaces, i.e., the higher distal surface 608a and the lower proximal surface 602a, form a step feature. According to an embodiment, the laser module is mounted on the lower proximal surface 602a of the stepped slider 602.

According to an embodiment, coupled with slider 602 is a heat-dissipating plate 608, which comprises the higher distal surface 608a. The heat-dissipating plate 608 is composed of a material that has a higher thermal conductivity than the material of which the slider 602 main body, including the lower proximal surface 602a, is composed. Consequently, the heat-dissipating plate 608 assists in dissipating the heat generated by laser 604 to the media by providing better thermal diffusion characteristics for slider 602 and slider assembly 600. According to an embodiment, the heat-dissipating plate 608 is composed primarily of silicon (Si). According to another embodiment, the heat-dissipating plate 408 is composed primarily of aluminum nitride (AlN).

FIG. 6B is a perspective view illustrating an interface between a heat-dissipating plate and a laser module of the HAMR head slider assembly of FIG. 6A, according to an embodiment of the invention. According to this embodiment, the interface between the heat-dissipating plate 608 and the submount 606 of the laser module comprises solder 612. As illustrated in FIG. 6A, the laser 604 is coupled to the submount 606 on the first lateral side (see, e.g., first lateral side 206c of FIG. 2). Thus, the heat-dissipating plate 608 may be shaped to be adjacent to the second lateral side 206d and the first and second longitudinal sides 206a, 206b of the submount 606. With such a configuration, the use of solder 612 for connecting the heat-dissipating plate 608 and the submount 606 may vary from implementation to implementation, such as use of a solder 612 fillet along any one or more of the second lateral side 206d and the first and second longitudinal sides 206a, 206b of the submount 606, or may be connected with a solder 612 fill largely along the entire interface of one or more of these interfaces. Furthermore, for a non-limiting example, an implementation study has shown that an approximately 23% improvement in temperature rise may be achieved by using a silicon heat-dissipating plate 608 connected with the submount 606, e.g., three connections, with solder 612.

FIG. 7A is a perspective view illustrating a heat-dissipating stepped HAMR head slider assembly, according to an embodiment of the invention. HAMR head slider assembly 700 (or simply slider assembly 700) comprises a laser module, comprising a laser 704 and an associated submount 706, mounted on a slider 702. Slider 702 has a higher distal surface 702b and an adjacent lower proximal surface 702a, with proximal and distal being described relative to the laser module. Therefore, slider 702 is referred to as a "stepped" slider because the adjacent surfaces, i.e., the higher distal surface 702b and the lower proximal surface 702a, form a step feature. According to an embodiment, the laser module is mounted on the lower proximal surface 702a of the stepped slider 702. Rather than using a heat-dissipating plate as in previously-described embodiments, the step feature of slider assembly 700 is formed directly from the slider main body material (e.g., AlTiC). For example, the slider body 702 may be etched to form the lower proximal surface 702a.

FIG. 7B is a perspective view illustrating an interface between a step feature and a laser module of the HAMR head slider assembly of FIG. 7A, according to an embodiment of the invention. According to this embodiment, the interface between the step and the submount 706 of the laser module comprises solder 712. As illustrated in FIG. 7A, the laser 704 is coupled to the submount 706 on the first lateral side (see, e.g., first lateral side 206c of FIG. 2). With such a configuration, solder 712 is used for connecting the second lateral side (see, e.g., second lateral side 206d of FIG. 2) of the submount 706 with the step feature and therefore the higher distal surface 702b. This configuration, while likely more simple to manufacture, has shown less effectiveness at heat dissipation than the previously-described embodiments.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A heat-assisted magnetic recording (HAMR) head slider assembly comprising:

a head slider comprising a magnetic write head configured to write to a magnetic-recording disk, said head slider comprising a higher distal surface and an adjacent lower proximal surface nearer said magnetic write head, both surfaces located on a disk-opposing side of said head slider, and wherein said lower proximal surface is a surface of a main body of said slider composed primarily of a first material;

a heat-dissipating plate comprising said higher distal surface and composed of a second material having a higher thermal conductivity than said first material; and a laser module mounted on said lower proximal surface.

2. The HAMR head slider of claim 1, wherein said second material is composed primarily of silicon.

3. The HAMR head slider of claim 1, wherein said second material is composed primarily of aluminum nitride.

4. The HAMR head slider of claim 1, wherein said laser module comprises:

a submount having first and second longitudinal sides and first and second lateral sides, wherein said first lateral side is closer to said write head than said second lateral side, and a laser coupled to said submount on said first longitudinal side and closer to said first lateral side than said second lateral side; and wherein said heat-dissipating plate is located adjacent to said second lateral side and said second longitudinal side opposing said laser.

5. The HAMR head slider of claim 4, further comprising a gap between said second lateral side of said submount and said heat-dissipating plate.

6. The HAMR head slider of claim 4, further comprising solder between said second lateral side of said submount and said heat-dissipating plate.

7. The HAMR head slider of claim 4, further comprising solder connecting said second lateral side and said first longitudinal side of said submount to said heat-dissipating plate.

8. The HAMR head slider of claim 4, further comprising solder connecting said second lateral side and said first longitudinal side of said submount to said heat-dissipating plate and solder connecting a longitudinal side of said laser and said heat-dissipating plate.

9. The HAMR head slider of claim 1, wherein said laser module comprises:

a submount having first and second longitudinal sides and first and second lateral sides, wherein said first lateral side is closer to said write head than said second lateral side, and a laser coupled to said submount on said first lateral side; and wherein said heat-dissipating plate is located adjacent to said second lateral side and said second longitudinal side opposing said laser and adjacent to a side of said laser.

10. The HAMR head slider of claim 9, further comprising solder connecting said second lateral side and said first and second longitudinal sides of said submount to said heat-dissipating plate.

11. The HAMR head slider of claim 1, wherein said lower proximal surface is a down-stepped surface formed by etching away material from a planar surface of said slider that includes said higher distal surface.

12. A heat-assisted magnetic recording (HAMR) head gimbal assembly (HGA) comprising:

a flexure coupled to a load beam;

a head slider coupled to said flexure and comprising a magnetic write head configured to write to a magnetic-recording disk, said head slider comprising a higher distal surface and an adjacent lower proximal surface nearer said magnetic write head, both surfaces located on a disk-opposing side of said head slider, and wherein said lower proximal surface is a surface of a main body of said slider composed primarily of a first material;

a heat-dissipating plate comprising said higher distal surface and composed of a second material having a higher thermal conductivity than said first material; and a laser module mounted on said lower proximal surface.

13. The HAMR HGA of claim 12, wherein said second material is composed primarily of silicon.

14. A hard disk drive, comprising:
a magnetic-recording disk rotatably mounted on a spindle;
a heat-assisted magnetic recording (HAMR) head slider comprising:
- a magnetic write head configured to write to said magnetic-recording disk, said head slider comprising a higher distal surface and an adjacent lower proximal surface nearer said magnetic write head, wherein both surfaces are located on a disk-opposing side of said head slider and said lower proximal surface is a surface of a main body of said slider composed primarily of a first material, and
- a heat-dissipating plate comprising said higher distal surface and composed of a second material having a higher thermal conductivity than said first material;
- a laser module mounted on said lower proximal surface; and
a voice coil motor configured to move said HAMR head slider to access portions of said magnetic-recording disk.

15. The hard disk drive of claim 14, wherein said second material is composed primarily of silicon.

16. The hard disk drive of claim 14, wherein said second material is composed primarily of aluminum nitride.

17. The hard disk drive of claim 14,
wherein said laser module comprises:
- a submount having first and second longitudinal sides and first and second lateral sides, wherein said first lateral side is closer to said write head than said second lateral side, and
- a laser coupled to said submount on said first longitudinal side and closer to said first lateral side than said second lateral side; and
wherein said heat-dissipating plate is located adjacent to said second lateral side and said second longitudinal side opposing said laser.

18. The hard disk drive of claim 17, further comprising a gap between said second lateral side of said submount and said heat-dissipating plate.

19. The hard disk drive of claim 17, further comprising solder between said second lateral side of said submount and said heat-dissipating plate.

20. The hard disk drive of claim 14,
wherein said laser module comprises:
- a submount having first and second longitudinal sides and first and second lateral sides, wherein said first lateral side is closer to said write head than said second lateral side, and
- a laser coupled to said submount on said first lateral side;
wherein said heat-dissipating plate is located adjacent to said second lateral side and said first and second longitudinal sides of said submount; and
further comprising solder connecting said second lateral side and said first and second longitudinal sides of said submount to said heat-dissipating plate.

* * * * *

UNITED STATES PATENT AND TRADEMARK OFFICE
CERTIFICATE OF CORRECTION

Page 1 of 1

PATENT NO. : 9,013,967 B1
APPLICATION NO. : 14/322707
DATED : April 21, 2015
INVENTOR(S) : Nakamura et al.

It is certified that error appears in the above-identified patent and that said Letters Patent is hereby corrected as shown below:

In the Claims

Column 10, line 35, cancel the text beginning with "7. The HAMR head slider" to and ending with "said heat-dissipating plate" and insert the following claim:

--7. The HAMR head slider of Claim 4, further comprising solder connecting said second lateral side and said second longitudinal side of said submount to said heat-dissipating plate.--

Column 10, line 38, cancel the text beginning with "8. The HAMR head slider" to and ending with "said heat-dissipating plate" and insert the following claim:

--8. The HAMR head slider of Claim 4, further comprising solder connecting said second lateral side and said second longitudinal side of said submount to said heat-dissipating plate and solder connecting a longitudinal side of said laser and said heat-dissipating plate.--

Signed and Sealed this
First Day of September, 2015

Michelle K. Lee
*Director of the United States Patent and Trademark Office*